United States Patent [19]

McGovern

[11] Patent Number: 5,157,056
[45] Date of Patent: Oct. 20, 1992

[54] HIGH RESILIENCY POLYURETHANE FOAMS WITH IMPROVED STATIC FATIGUE PROPERTIES

[75] Inventor: Michael J. McGovern, Swedesboro, N.J.

[73] Assignee: ARCO Chemical Technology, L.P., Wilmington, Del.

[21] Appl. No.: 731,586

[22] Filed: Jul. 17, 1991

[51] Int. Cl.$^5$ ............................................. C08G 18/14
[52] U.S. Cl. ..................... 521/107; 521/108
[58] Field of Search .............................. 521/107, 108

[56] References Cited

U.S. PATENT DOCUMENTS

| | | | |
|---|---|---|---|
| 3,171,819 | 3/1965 | Powanda | 521/107 |
| 4,144,387 | 3/1979 | Anderson et al. | 521/108 |
| 4,652,485 | 3/1987 | Fesman | 521/108 |

OTHER PUBLICATIONS

"Stauffer Organic Flame Retardants", Stauffer Chemical Co., May, 1980.

*Primary Examiner*—Maurice J. Welsh
*Attorney, Agent, or Firm*—David L. Mossman

[57] ABSTRACT

A novel high resiliency (HR) polyurethane resin foam composition is provided which contains phosphorus compounds to improve the static fatigue properties thereof. An unusual benefit of using certain phosphorus compounds in HR foams is that improved compression set characteristics are obtained. As might be expected, flammability properties are also improved. Some preferred phosphorus additives include, but are not limited to phosphates, phosphonates, phosphites and phosphine oxides such as tri($\beta$-chloroethyl)phosphate; tri($\beta$-chloropropyl)phosphate; dichloroethyl methylphosphate; tetrakis(2-chloroethyl) ethylene diphosphate; dimethyl methylphosphonate; diphenyl methylphosphate; triethylphosphate; tricrysylphosphate (TCP); triphenylphosphite; triethylphosphite; triethylphosphine oxide; triphenylphosphine oxide; and mixtures thereof.

15 Claims, No Drawings

HIGH RESILIENCY POLYURETHANE FOAMS WITH IMPROVED STATIC FATIGUE PROPERTIES

FIELD OF THE INVENTION

The invention relates to the synthesis of polyurethane compositions and methods for making the same, and in one aspect, is more particularly related to high resiliency (HR) polyurethane compositions that use flame retardant additives to improve static fatigue properties.

BACKGROUND OF THE INVENTION

Polyurethane foams, formed by the reaction of a polyisocyanate with a polyhydroxyl-containing compound in the presence of a suitable catalyst, are widely accepted as padding materials for cushions in furniture, automobiles and the like. Polyurethane foams are also used as sponges and for other uses that require liquid absorption properties, such as specialty packaging and personal care and hygiene items. Typically, the foams are made in the form of slabs, which are cut to shape, or they are molded to specific needs.

Molded foams are commonly of the "high resilience" (HR) type, and are characterized by high sag factors and improved hysteresis curves compared to the usual slab foams. HR foams are often crushed to give the foams sufficient "breathability" since HR foams tend to have a high percentage of closed cells.

Foam static fatigue, as measured by compression set data, or the ability of the foam to recover after it is compressed by a certain amount, is a constant concern to the end user of the foam, as it is a measure of durability. Limits of acceptability are typically specified by the foam purchaser.

It would be useful to devise an improved HR polyurethane composition employing one additive which could improve the static fatigue properties. If another property, such as the flammability-resistance characteristics of the resultant HR foam could also be improved, it would be an added bonus. While it is known that phosphorus compounds, such as halogenated phosphate compounds, serve as flame retardants in flexible polyurethane foams, such flame retardants are not used in HR flexible foams because these HR foams typically pass flammability characteristic tests without additives. Thus, one skilled in the art would not be motivated to and would not be expected to add flame retardants to HR polyurethane foams.

SUMMARY OF THE INVENTION

Accordingly, it is an object of the present invention to provide a high resilience polyurethane composition having improved static fatigue properties.

It is yet another object of the invention to provide a HR polyurethane composition having improved static fatigue properties which employs a phosphorus compound which also retards the combustibility of the foam.

It is another object of the present invention to provide a HR polyurethane composition that can be readily produced with available polyurethane technology.

In carrying out these and other objects of the invention, there is provided, in one form, a high resilience (HR) polyurethane foam composition having improved static fatigue properties which is the reaction product of a polyol with a polyisocyanate in the presence of a polyurethane catalyst, and further in the presence of a blowing agent comprising water, in the additional presence of at least one phosphorous compound of a formula selected from the group consisting of:

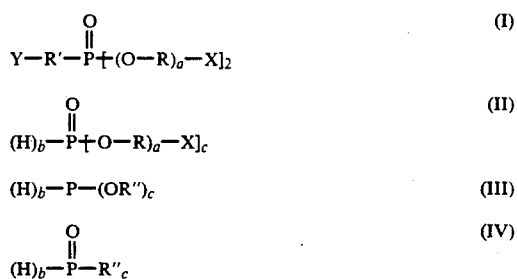

where
R is an alkylene group of 1 to 5 carbon atoms;
R' is an alkylene group of 1 to 9 carbon atoms or an arylene group of 6 to 10 carbon atoms when Y is other than hydrogen, R' is R" when Y is hydrogen;
R" is an alkyl group of 1 to 9 carbon atoms or an aryl group of 6 to 10 carbon atoms;
X is hydrogen or halogen;
Y is hydrogen or $-P(=O)-[-(O-R)_a-X]_2$;
a is from 1 to 4;
b is 0 when c is 3; and
b is 1 when c is 2;
where the phosphorous compound is present in an amount effective to improve static fatigue properties over a HR polyurethane foam composition without said effective amount of phosphorous compound.

DETAILED DESCRIPTION OF THE INVENTION

It has been discovered that phosphorous compounds, such as halogenated phosphates and halogenated phosphonates, generally thought of as flame retardants for non-high resilience foams enable the production of flexible HR polyurethane foams having improved static fatigue properties as measured by compression set tests, as well as other excellent physical properties. This is completely unexpected. As explained previously, HR polyurethane foams do not require flame retardants and thus one skilled in the art would not think to employ them in HR foams. While one would expect the addition of a flame retardant to further improve the good flammability resistance of HR foams, the improvement of static fatigue characteristics was completely unexpected.

The researcher herein added these materials to some HR foams which employed experimental polymer polyols because the foams surprisingly did not have as good flammability characteristics as expected. An additional surprise occurred when these materials unexpectedly improved compression set properties.

The effective phosphorus compounds useful in this invention have a structure such as one of the following structures (I-IV). The compounds may be phosphonate compounds of the structure (I):

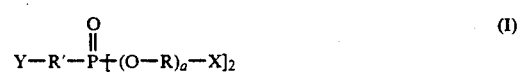

where R is an alkylene group of 1 to 5 carbon atoms; R' is an alkylene group of 1 to 9 carbon atoms or an arylene group of 6 to 10 carbon atoms when Y is other than hydrogen and R' is R" when Y is hydrogen (R" being defined below as an alkyl group of from 1 to 9 carbon atoms or an aryl group of from 6 to 10 carbon atoms); a ranges from 1 to 4; X is hydrogen or halogen such as fluorine, chlorine, bromine, etc.; and Y is hydrogen or —P(=O)—[—(O—R)$_a$—X]$_2$, where R, X and a are defined as above. Compounds of this group include, but are not limited to, tetrakis(2-chloroethyl)-ethylene diphosphate; dichloroethyl methylphosphonate; dimethyl methylphosphonate (DMMP); diphenyl methylphosphonate and the like.

Suitable phosphorus compounds also include phosphate compounds of formula (II):

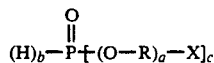

(II)

where R, X and a have the definitions given above, and where b is 0 if c is 3, and where b is 1 if c is 2. Useful phosphate compounds include, but are not limited to, tri(β-chloroethyl) phosphate; trichloropropyl phosphate; triethylphosphate; triphenyl phosphate; tricrysyl phosphate (TCP) corresponding diphosphates and the like.

Phosphites are also useful additives to increase the static fatigue properties of HR foams, and may have the structure (III):

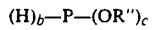

(III)

where R" is an alkyl group of from 1 to 9 carbon atoms or an aryl group of from 6 to 10 carbon atoms; and where b and c are defined as above. Representative examples of suitable compounds include, but are not limited to triphenyl phosphite, triethylphosphite, diphenyl phosphite, diethyl phosphite and the like.

Additional phosphorus compounds which are useful include phosphine oxides having the formula (IV):

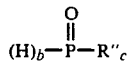

(IV)

where R", b and c are defined as above. Suitable phosphine oxide compounds for use in this invention include, but are not limited to triethyl phosphine oxide, triphenyl phosphine oxide, diethyl phosphine oxide, diphenyl phosphine oxide, and the like.

When X is halogen in the above structures, it preferably is chlorine or bromine. A preferred group of halogenated phosphate additives have the formulae:

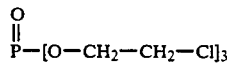

[tri(β-chloroethyl)phosphate];

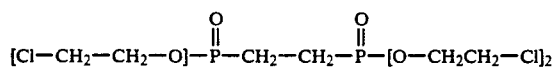

[tetrakis(2-chloroethyl)ethylene diphosphate]; dimethyl methylphosphonate (DMMP); and mixtures thereof. Suitable commercially available halogenated phosphates falling within these definitions include, but are not necessarily limited to, Fyrol® EFF, Fyrol CEF phosphates, both made by Stauffer Chemical Company, and Thermolin® 1011 materials made by Olin Corporation, Fyrol DMMP, etc.

In one embodiment of the invention, the proportions of the effective phosphorus additive is determined by trial and error, depending on the formulation with which the additive is to be used. In general, it has been discovered that these materials may be used in proportions less than those recommended for the phosphates when they are used as flame retardant additives for slab stock foams. Roughly, the phosphorus compounds are used in proportions of at least 0.5 parts per 100 parts of polyol in the formulation, and more preferably in a proportion of at least 2.0 parts per hundred (pph) polyol.

In accordance with this invention, the remaining polyurethane foam components are expected to be conventional, indicating that the invention is compatible with standard formulations. For example, a variety of relatively high molecular weight polyether and/or polyester polyols are expected to be useful together with the low molecular weight polyethylene glycol in the polyol blends for the polyurethane compositions of this invention. These polyols include, but are not necessarily limited to ethylene oxide (EO) capped polyols and polyols not capped with EO, as well as propylene oxide (PO) and/or butylene oxide containing polyols. The polyols may contain blocks or random distributions of these various alkylene oxides added to suitable initiators. In one aspect, the polyol preferably has a molecular weight of from about 2000 to 10,000, and more preferably from about 3000 to 8000, and is typically made by the reaction of an initiator having a plurality of reactive hydrogens thereon with one or more alkylene oxides. Suitable initiators include, but are not limited to, glycerin, alkanolamines, alkylamines, aryl or aromatic amines, sucrose, sorbitol, trimethylol propane (TMP), α-methylglucoside, β-methylglucoside, or other methylglucoside, resins of phenol, aniline and mixed phenol aniline, such as methylenedianiline or bisphenol A, Mannich condensates and mixtures thereof, for example. The polyol may be made by alkoxylating the initiator with a desired number of moles of an alkylene oxide. Preferably, the alkylene oxide has two to four carbon atoms, and is thus, EO, PO, butylene oxide or mixtures thereof, as noted. The alkylene oxides may be mixed upon addition, or may be added to the polyol initiator chain separately to form blocks or caps. In one aspect, a mixture of ethylene oxide and propylene oxide are added to the initiator. The alkoxylation may or may not be catalyzed; KOH is a commonly used catalyst, although others may be employed. For example, double metal cyanide catalysts may be employed, in particular zinc hexacyanocobaltate, and the polyols may be prepared in accordance with the methods described in U.S. Pat. Nos. 3,029,505; 3,900,518; 3,941,049 and 4,355,100, incorporated by reference herein. Preferably, the relatively high molecular weight polyalkylene triol is a mixed polypropylene oxide/polyethylene oxide copolymer triol. Alternatively, various polymer polyols may also be employed as completely replacing or in conjunction with suitable, enumerated polyol components. For example, suitable polymer polyols include those where the dispersed polymer is styrene/acrylonitrile copolymer (SAN); Poly Harnstoff Dispersion (PHD); polyisocyanate polyaminoalcohol; (PIPA) and the like. The base polyols for these polymer polyols are those described above. While some of these polyol materials are more commonly known as rigid polyols, it is anticipated that under some conditions they could serve as useful HR foam polyols.

A catalyst is typically employed in preparing HR polyurethane foams in the conventional manner. Such catalysts may include one or more of the following:

(a) Tertiary amines such as trimethylamine; triethylamine; N-methylmorpholine; N-ethylmorpholine; N,N-dimethylbenzylamine; N,N-dimethylethanolamine; N,N,N',N'-tetramethyl-1,4-butanediamine; N,N-dimethylpiperazine; 1,4-diazobicyclo[2.2.2]octane; triethylenediamine and the like;

(b) Tertiary phosphines such as trialkylphosphines; dialkylbenzylphosphines, and the like;

(c) Strong bases, such as alkali and alkaline earth metal hydroxides; alkoxides; and phenoxides;

(d) Acidic metal salts of strong acids, such as ferric chloride; stannic chloride; stannous chloride; antimony trichloride; bismuth nitrate and chloride; and the like;

(e) Chelates of various metals such as those which can be obtained from acetylacetone; benzoylacetone; trifluoroacetyl acetone; ethyl acetoacetate; salicyclaldehyde; cyclopentanone-1-carboxylate; acetylacetoimine; bis-acetylacetonealkylenediamine; salicyclaldehydeimine; and the like, with various metals such as Be, Mg, Zn, Cd, Pd, Ti, Zr, Sn, As, Bi, Cr, Mo, Mn, Fe, Co, and Ni;

(f) Alcoholates and phenolates of various metals, such as $Ti(OR)_4$; $Sn(OR)_4$; $Al(OR)_3$; and the like, wherein R is alkyl or aryl, and the reaction products of alcoholates with carboxylic acids, $\beta$-diketones, and 2-(N,N-dialkylamino)alcohols;

(g) Salts of organic acids with a variety of metals, such as alkali metals, alkaline earth metals, Al, Sn, Pb, Mn, Co, Ni and Cu, including, for example, sodium acetate, stannous octoate, stannous oleate, lead octoate, metallic driers such as manganese and cobalt naphthenate, and the like; and (h) Organometallic derivatives of tetravalent tin, trivalent and pentavalent As, Sb, and Bi and metal carbonyls of iron and cobalt.

Of course, combinations of any of the above polyurethane catalysts may be employed. Usually, the amount of catalyst employed ranges from about 0.01 to about 5.0 pbw percent, based on 100 pbw of the polyol. More often, the amount of catalyst used is about 0.2 to about 2.0 pbw.

The polyol blend for the HR polyurethane composition is reacted in the presence of one or more of the above catalysts with a polyisocyanate according to conventional procedures. The polyisocyanate used may be any aromatic or aliphatic polyisocyanate, such as toluene diisocyanates (TDIs); polymeric isocyanates and aliphatic diisocyanates. Typical aromatic polyisocyanates include, but are not limited to, m-phenylene diisocyanate; p-phenylene diisocyanate; polymethylene polyphenylisocyanate; 2,4-toluene diisocyanate; 2,6-toluene diisocyanate; dianisidine diisocyanate; bitolylene diisocyanate; naphthalene-1,4-diisocyanate; diphenylene-4,4'-diisocyanate; aliphatic-aromatic diisocyanates, such as xylylene-1,4-diisocyanate; xylylene-1,2-diisocyanate; xylylene-1,3-diisocyanate; bis(4-isocyanatophenyl)methane; bis(3-methyl-4-isocyanatophenyl)methane; and 4,4'-diphenylpropane diisocyanate. Suitable aliphatic diisocyanates would include isophorone diisocyanate; hexamethylene diisocyanate; and methylene-bis-cyclohexylisocyanate. Toluene diisocyanates are preferred, in one aspect of the invention.

Aromatic polyisocyanates suitable for use include methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts.

Foaming is carried out in the presence of water which reacts with the isocyanate to produce carbon dioxide that acts as the blowing agent. The water is normally used in amounts of 0.5 to 7 parts by weight, preferably, 1.5 to 6.5 pbw based on 100 pbw of the polyol present. Auxiliary blowing agents such as the chlorofluorocarbons or methylene chloride may be used if necessary or desired. Additives to regulate the cell size and the cell structure, for example, silicone surfactants such as dimethylpolysiloxanes, may also be added to the foaming mixture however. Fillers, dyes or plasticizers of known types may also be used, of course. These and other additives are well known to those skilled in the art.

The invention has been demonstrated in the laboratory. The following are examples of the practice of incorporating phosphorus compounds into HR polyurethane flexible foams. All results were generated by mixing the indicate proportions of ingredients and placing them into a 16"×16"×4" mold. Physical properties were then measured as indicated. Compression set measurements of static fatigue both in the absence of and after humid aging (HA). The percent recovery after the indicated compressions (50 and 75%) is expressed negatively such that the higher the value given, the lower the recovery and the poorer the static fatigue properties.

It will be seen in all Tables of data that the HR foams using the halogenated phosphate additives (such as Fyrol EFF, Fyrol CEF and Thermolin 101) give better compression set values (lower numbers) than the control HR foams using no additive, for instance, Examples 1, 5, 8, 12, 15, 18, 21 and 27. In Examples 1 through 28, the phosphorus compound was added to the "B" (polyol) component first immediately before the toluene diisocyanate (TDI) was added. TDI was used as the isocyanate in all of these Examples.

TABLE I

| Use of Halogenated Phosphorus Compounds to Improve Static Fatigue | | | | | | | |
|---|---|---|---|---|---|---|---|
| ↓ Ingr./Ex.→ | 1 | 2 | 3 | 4 | 5 | 6 | 7 |
| Thanol ® SF-5507 | 50.00 | 50.00 | 50.00 | 50.00 | 50.00 | 50.00 | 50.00 |
| Niax ® 34-28 | 50.00 | 50.00 | 50.00 | 50.00 | 50.00 | 50.00 | 50.00 |
| Water | 3.74 | 3.74 | 3.74 | 3.74 | 3.74 | 3.74 | 3.74 |
| 85/15: DEA in $H_2O$ | 1.76 | 1.76 | 1.76 | 1.76 | 1.76 | 1.76 | 1.76 |
| DC-5034 | 1.50 | 1.50 | 1.50 | 1.50 | 1.50 | 1.50 | 1.50 |
| Niax ® A-107 | 0.30 | 0.30 | 0.30 | 0.30 | 0.30 | 0.30 | 0.30 |
| Dabco ® 33LV | 0.55 | 0.55 | 0.55 | 0.55 | 0.55 | 0.55 | 0.55 |
| Fyrol EFF | — | 2.00 | — | — | — | 2.00 | — |

TABLE I-continued

Use of Halogenated Phosphorus Compounds to Improve Static Fatigue

|  | 1 | 2 | 3 | 4 | 5 | 6 | 7 |
|---|---|---|---|---|---|---|---|
| Fyrol CEF | — | — | 2.00 | — | — | — | 2.00 |
| Thermolin 101 | — | — | — | 2.00 | — | — | — |
| TOTAL: | 107.85 | 109.85 | 109.85 | 109.85 | 107.85 | 109.85 | 109.85 |
| Isocyanate Index | 100 | 100 | 100 | 100 | 100 | 100 | 100 |
| Isocyanate Wt. | 47.91 | 47.91 | 47.91 | 47.91 | 47.91 | 47.91 | 47.91 |
| PROPERTIES | | | | | | | |
| Density-Part Wt. | 484.00 | 471.00 | 476.00 | 474.00 | 466.00 | 476.00 | 474.00 |
| ILD | | | | | | | |
| 25% | 25.00 | 21.10 | 22.20 | 21.60 | 23.10 | 20.80 | 20.60 |
| 50% | 47.30 | 40.10 | 42.80 | 42.80 | 44.80 | 40.10 | 40.90 |
| 65% | 74.00 | 64.60 | 67.00 | 74.20 | 70.20 | 63.90 | 64.70 |
| 25%R[1] | 18.90 | 16.10 | 16.70 | 16.20 | 17.10 | 15.60 | 15.60 |
| 25% Part Wt.[2] | 5.17 | 4.48 | 4.66 | 4.46 | 4.96 | 4.37 | 4.35 |
| 65% Part Wt. | 15.29 | 13.72 | 14.08 | 15.65 | 15.06 | 13.42 | 13.65 |
| Sag Factor | 2.96 | 3.06 | 3.02 | 3.44 | 3.04 | 3.07 | 3.14 |
| Comp. Set 50%[3] | 20.71 | 14.92 | 20.29 | 23.71 | 25.47 | 18.19 | 20.12 |
| Comp. Set 75% | 24.67 | 14.11 | 17.63 | 17.19 | 23.93 | 15.83 | 17.10 |
| C.S. 50% H.A.[4] | 35.53 | 25.27 | 31.72 | 30.08 | 36.12 | 32.49 | 35.52 |
| Wt. St. 50%[5] | 81.51 | 78.41 | 76.42 | 85.02 | 80.85 | 74.28 | 76.77 |

[1] A 25% return value ILD measured after foam has been compressed to 65% and allowed to recover to 25%.
[2] In this parameter, hardness is adjusted for foam density.
[3] Note: All compression sets are calculated as a % of compression, i.e. $(ht_i - ht_f)/ht_c$, where i refers to initial, f is final and c is compression.
[4] Compression set, after humid aging.
[5] The foam is compressed and held at 50% in a wet environment and then compression set is measured on the same bases as in note 3.

TABLE II

Use of Halogenated Phosphorus Compounds to Improve Static Fatigue

| ↓ Ingr./Ex.→ | 8 | 9 | 10 | 11 | 12 | 13 | 14 |
|---|---|---|---|---|---|---|---|
| Thanol ® SF-5507 | 50.00 | 50.00 | 50.00 | 50.00 | 50.00 | 50.00 | 50.00 |
| P-973 | 50.00 | 50.00 | 50.00 | 50.00 | 50.00 | 50.00 | 50.00 |
| Water | 3.74 | 3.74 | 3.74 | 3.74 | 3.74 | 3.74 | 3.74 |
| 85/15: DEA in H2O | 1.76 | 1.76 | 1.76 | 1.76 | 1.76 | 1.76 | 1.76 |
| DC-5034 | 1.50 | 1.50 | 1.50 | 1.50 | 1.50 | 1.50 | 1.50 |
| Niax ® A-107 | 0.30 | 0.30 | 0.30 | 0.30 | 0.30 | 0.30 | 0.30 |
| Dabco ® 33LV | 0.55 | 0.55 | 0.55 | 0.55 | 0.55 | 0.55 | 0.55 |
| Fyrol EFF | — | 2.00 | — | — | — | 2.00 | — |
| Fyrol CEF | — | — | 2.00 | — | — | — | — |
| Thermolin 101 | — | — | — | 2.00 | — | — | 2.00 |
| TOTAL: | 107.85 | 109.85 | 109.85 | 109.85 | 107.85 | 109.85 | 109.85 |
| Isocyanate Index | 100 | 100 | 100 | 100 | 100 | 100 | 100 |
| Isocyanate Wt. | 47.86 | 47.86 | 47.86 | 47.86 | 47.86 | 47.86 | 47.86 |
| PROPERTIES | | | | | | | |
| Density-Part Wt. | 463.00 | 470.00 | 472.00 | 474.00 | 463.00 | 475.00 | 476.00 |
| ILD | | | | | | | |
| 25% | 22.10 | 21.50 | 22.10 | 21.10 | 23.10 | 21.60 | 22.10 |
| 50% | 44.90 | 43.10 | 44.20 | 42.60 | 45.90 | 43.10 | 43.00 |
| 65% | 72.00 | 70.50 | 71.90 | 68.90 | 72.20 | 69.60 | 68.809 |
| 25%R | 16.50 | 16.60 | 16.60 | 15.90 | 16.80 | 16.20 | 16.30 |
| 25% Part Wt. | 4.77 | 4.57 | 4.68 | 4.45 | 4.99 | 4.55 | 4.64 |
| 65% Part Wt. | 15.55 | 15.00 | 15.23 | 14.54 | 15.59 | 14.65 | 14.45 |
| Sag Factor | 3.26 | 3.28 | 3.25 | 3.27 | 3.13 | 3.22 | 3.11 |
| Comp. Set 50% | 27.29 | 21.28 | 22.58 | 17.69 | 21.71 | 22.50 | 21.56 |
| Comp. Set 75% | 52.38 | 15.63 | 15.84 | 22.33 | 59.88 | 18.06 | 22.17 |
| C.S. 50% H.A. | 41.72 | 28.33 | 35.47 | 54.24 | 57.01 | 34.98 | 39.49 |
| Wt. St. 50% | 80.98 | 76.96 | 77.95 | 79.24 | 83.00 | 73.31 | 76.36 |

EXAMPLES 15-23

These Examples compare polyurethane HR foams made using the phosphorus additives of this invention with foams made using a tribromostyrene(TBS)-based polymer polyol, identified as AN/TBS since the polymer polyol is made by copolymerizing acrylonitrile and TBS in a base polyol and containing 30% solids. Control Examples 15 and 18 are also provided. It will be seen that the foams made using AN/TBS provided improved static fatigue properties as well. It will also be seen that other properties of the foams of these and subsequent Examples are not adversely affected by the phosphorus additives of this invention. TDI was used as the isocyanate in all subsequent Examples.

TABLE IIIa

Use of Halogenated Phosphorus Compounds and AN/TBS Polymer Polyol to Improve Static Fatigue

| ↓ Ingr./Ex.→ | 15 | 16 | 17 | 18 | 19 |
|---|---|---|---|---|---|
| Thanol ® SF-5507 | 67.00 | 67.00 | 67.00 | 67.00 | 67.00 |
| P-973 | 33.00 | — | 33.00 | 33.00 | — |
| Water | 3.74 | 3.74 | 3.74 | 3.74 | 3.74 |
| 85/15: DEA in H2O | 1.76 | 1.76 | 1.76 | 1.76 | 1.76 |

TABLE IIIa-continued

Use of Halogenated Phosphorus Compounds and AN/TBS Polymer Polyol to Improve Static Fatigue

|  | 15 | 16 | 17 | 18 | 19 |
|---|---|---|---|---|---|
| DC-5034 | 1.50 | 1.50 | 1.50 | 1.50 | 1.50 |
| BL-17 | 0.30 | 0.30 | 0.30 | 0.30 | 0.30 |
| Dabco ® 33LV | 0.55 | 0.55 | 0.55 | 0.55 | 0.55 |
| AN/TBS | — | 33.00 | — | — | 33.00 |
| Fyrol EFF | — | — | 2.00 | — | — |
| TOTAL: | 107.85 | 107.85 | 107.85 | 107.85 | 107.85 |
| Isocyanate Index | 100 | 100 | 100 | 100 | 100 |
| PROPERTIES |  |  |  |  |  |
| Density-Part Wt. | 472.00 | 469.60 | 487.50 | 471.60 | 464.40 |
| Density-Core Wt. | 1.92 | 1.84 | 1.94 | 1.87 | 1.82 |
| ILD |  |  |  |  |  |
| 25% | 23.40 | 23.70 | 23.60 | 22.60 | 22.80 |
| 50% | 47.50 | 45.70 | 46.20 | 45.50 | 43.80 |
| 65% | 73.70 | 72.50 | 72.20 | 70.20 | 68.80 |
| 25%R | 18.00 | 18.50 | 18.20 | 17.50 | 17.70 |
| 25% Core Wt. | 12.19 | 12.88 | 12.09 | 12.09 | 12.53 |
| 65% Core Wt. | 38.39 | 39.40 | 37.22 | 37.54 | 37.80 |
| CLD Core | 3.02 | 2.93 | 2.94 | 3.05 | 2.97 |
| 25% Part Wt. | 4.96 | 5.05 | 4.84 | 4.79 | 4.91 |
| 65% Part Wt. | 15.61 | 15.44 | 14.81 | 14.89 | 14.81 |
| Sag Factor | 3.15 | 3.06 | 3.06 | 3.11 | 3.02 |
| CLD 50% | 0.58 | 0.54 | 0.57 | 0.57 | 0.54 |
| CLD 50%; HA | 0.53 | 0.49 | 0.53 | 0.53 | 0.50 |
| % Loss | 8.6% | 9.3% | 7.0% | 7.0% | 7.4% |
| MVSS-302 |  |  |  |  |  |
| in./min | 3.62 | 3.51 | SE[1] | 3.64 | 3.46 |
| in. | 10.00 | >4 | 0.00 | 10.00 | >8 |
| sec. | 167.00 | >63 | 0.00 | 165.00 | >139 |
| Comp. Set 50% | 17.86 | 16.59 | 13.99 | 17.67 | 15.83 |
| Comp. Set 75% | 18.87 | 16.40 | 12.15 | 17.04 | 14.90 |
| C.S. 50% H.A. | 22.71 | 22.78 | 20.14 | 21.63 | 20.55 |
| Wt. St. 50% | 65.10 | 65.10 | 54.69 | 67.68 | 66.65 |
| Tear strength, psi | 1.00 | 1.20 | 1.20 | 1.50 | 1.10 |
| Tensile str., psi | 16.50 | 18.70 | 18.70 | 19.90 | 18.30 |
| Tensile DA | 21.50 | 19.70 | 19.60 | 22.10 | 20.90 |
| % Loss | −30.3 | −5.3 | −4.8 | −14.2 | −10.4 |
| Elongation, % | 96.00 | 112.50 | 108.00 | 1.40 | 110.00 |
| DA Elongation[2] | 132.00 | 132.00 | 124.00 | 126.00 | 134.00 |

[1] Self-extinguished.
[2] DA Elongation is the elongation measurement after aging 22 hrs. at 140° C.

TABLE IIIb

Use of Halogenated Phosphorus Compounds and AN/TBS Polymer Polyol to Improve Static Fatigue

|  | 20 | 21 | 22 | 23 |
|---|---|---|---|---|
| ↓ Ingr./Ex.→ |  |  |  |  |
| Thanol ® SF-5507 | 67.00 | 67.00 | 67.00 | 67.00 |
| P-973 | 33.00 | 33.00 | — | 33.00 |
| Water | 3.74 | 3.74 | 3.74 | 3.74 |
| 85/15: DEA in H₂O | 1.76 | 1.76 | 1.76 | 1.76 |
| DC-5034 | 1.50 | 1.50 | 1.50 | 1.50 |
| BL-17 | 0.30 | 0.30 | 0.30 | 0.30 |
| Dabco ® 33LV | 0.55 | 0.55 | 0.55 | 0.55 |
| AN/TBS | — | — | 33.00 | — |
| Fyrol EFF | 2.00 | — | — | 2.00 |
| TOTAL: | 107.85 | 107.85 | 107.85 | 107.85 |
| Isocyanate Index | 100 | 100 | 100 | 100 |
| PROPERTIES |  |  |  |  |
| Density-Part Wt. | 482.10 | 471.80 | 467.00 | 484.80 |
| Density-Core Wt. | 1.93 | 1.90 | 1.83 | 1.94 |
| ILD |  |  |  |  |
| 25% | 22.20 | 23.00 | 23.25 | 22.90 |
| 50% | 44.90 | 46.50 | 44.75 | 45.55 |
| 65% | 71.50 | 71.95 | 70.65 | 71.85 |
| 25%R | 17.20 | 17.75 | 18.10 | 17.70 |
| 25% Core Wt. | 11.50 | 12.14 | 12.70 | 11.83 |
| 65% Core Wt. | 37.05 | 37.96 | 38.60 | 37.13 |
| CLD Core | 3.06 | 3.03 | 2.95 | 3.00 |
| 25% Part Wt. | 4.60 | 4.87 | 4.98 | 4.72 |
| 65% Part Wt. | 14.83 | 15.25 | 15.13 | 14.82 |
| Sag Factor | 3.22 | 3.13 | 3.04 | 3.14 |
| CLD 50% | 0.59 | 0.58 | 0.54 | 0.58 |
| CLD 50%; HA | 0.55 | 0.53 | 0.50 | 0.54 |
| % Loss | 6.8 | 7.8 | 8.3 | 6.9 |
| Comp. Set 50% | 14.18 | 17.77 | 16.21 | 14.09 |
| Comp. Set 75% | 12.26 | 17.96 | 15.65 | 12.21 |
| C.S. 50% H.A. | 17.40 | 22.17 | 21.67 | 18.77 |
| Wt. St. 50% | 59.56 | 66.39 | 65.88 | 57.13 |
| Tear strength, psi | 1.00 | 1.25 | 1.15 | 1.10 |
| Tensile str., psi | 17.30 | 18.20 | 18.50 | 18.00 |
| Tensile DA | 19.10 | 21.80 | 20.30 | 19.35 |
| % Loss | −10.4 | −20.7 | −9.8 | −7.6 |
| Elongation, % | 98.00 | 48.70 | 111.25 | 103.00 |
| DA Elongation | 120.00 | 129.00 | 133.00 | 122.00 |

EXAMPLES 24-30

Examples 24–30 investigate the use levels of a specific halogenated phosphate Fyrol EFF, and also examines blending the additive in the isocyanate component or the polyol component ("B"-component). The data given are actually the average of two runs under the same conditions. A precipitate was noticed when Fyrol EFF as added to the TDI. Thus, it was determined that the additives are preferably added to the B-component just before or at the isocyanate addition. Control Examples 27 is also provided. It appears that an optimum level for this system is 2.0 phosphonate compound php. Additional additive offers no technical advantage, but also does not cause a negative effect.

TABLE IV

Halogenated Phosphorus Compounds at Various Levels to Improve Static Fatigue

|  | 24 | 25 | 26 | 27 | 28 | 29 | 30 |
|---|---|---|---|---|---|---|---|
| ↓ Ingr./Ex.→ |  |  |  |  |  |  |  |
| Thanol ® SF-5507 | 50.00 | 50.00 | 50.00 | 50.00 | 50.00 | 50.00 | 50.00 |
| Niax 34-28 | 50.00 | 50.00 | 50.00 | 50.00 | 50.00 | 50.00 | 50.00 |
| Water | 3.74 | 3.74 | 3.74 | 3.74 | 3.74 | 3.74 | 3.74 |
| 85/15: DEA in H₂O | 1.76 | 1.76 | 1.76 | 1.76 | 1.76 | 1.76 | 1.76 |
| DC-5034 | 1.50 | 1.50 | 1.50 | 1.50 | 1.50 | 1.50 | 1.50 |
| BL-17 | 0.30 | 0.30 | 0.30 | 0.30 | 0.30 | 0.30 | 0.30 |
| Dabco ® 33LV | 0.55 | 0.55 | 0.55 | 0.55 | 0.55 | 0.55 | 0.55 |
| Fyrol EFF | 1.00 | 2.00 | 5.00 | — | 1.00 | 2.00 | 5.00 |
| TOTAL: | 108.85 | 109.85 | 112.85 | 107.85 | 108.85 | 109.85 | 112.85 |
| Isocyanate Index | 100 | 100 | 100 | 100 | 100 | 100 | 100 |
| Isoc. Add., g. | 47.91 | 47.9 | 47.9 | 47.9 | 48.91 | 49.91 | 52.91 |
| PROPERTIES |  |  |  |  |  |  |  |
| Density-Part Wt. | 464.15 | 470.95 | 476.35 | 455.05 | 458.55 | 462.2 | 474.45 |
| Density-Core Wt. | 1.82 | 1.86 | 1.92 | 1.83 | 1.81 | 1.82 | 1.88 |
| ILD |  |  |  |  |  |  |  |

TABLE IV-continued

Halogenated Phosphorus Compounds at Various Levels to Improve Static Fatigue

|  | 24 | 25 | 26 | 27 | 28 | 29 | 30 |
|---|---|---|---|---|---|---|---|
| 25% | 23.90 | 24.65 | 23.90 | 23.50 | 23.90 | 24.30 | 24.55 |
| 65% | 72.40 | 73.65 | 72.40 | 71.90 | 71.50 | 73.00 | 73.40 |
| 25%R | 18.65 | 19.40 | 18.90 | 18.65 | 18.80 | 19.00 | 19.15 |
| 25% Core Wt. | 13.18 | 13.29 | 12.45 | 12.84 | 13.20 | 13.39 | 13.09 |
| 65% Core Wt. | 39.91 | 39.71 | 37.71 | 39.29 | 39.50 | 40.22 | 39.15 |
| 25% Part Wt. | 5.15 | 5.23 | 5.02 | 5.16 | 5.21 | 5.26 | 5.17 |
| 65% Part Wt. | 15.60 | 15.64 | 15.20 | 15.80 | 15.59 | 15.79 | 15.49 |
| Sag Factor | 3.03 | 2.99 | 3.03 | 3.06 | 2.99 | 3.00 | 2.99 |
| Comp. Set 50% | 15.60 | 13.55 | 13.71 | 17.20 | 14.64 | 15.47 | 15.82 |
| Comp. Set 75% | 14.71 | 13.93 | 13.44 | 24.11 | 13.54 | 13.97 | 14.77 |
| C.S. 50% H.A. | 24.35 | 23.32 | 22.87 | 26.48 | 25.02 | 25.99 | 27.02 |
| Tear strength, psi | 1.45 | 1.55 | 1.40 | 1.35 | 1.35 | 1.40 | 1.50 |
| Tensile str., psi | 19.05 | 20.50 | 20.45 | 21.00 | 20.65 | 21.50 | 20.55 |
| Tensile DA | 24.15 | 24.40 | 22.60 | 25.05 | 23.95 | 23.85 | 24.65 |
| % Loss | −26.9 | −20.2 | −10.5 | −19.3 | −16.7 | −11.1 | −20.5 |
| Elongation, % | 108.00 | 109.50 | 106.00 | 105.50 | 105.00 | 107.00 | 107.00 |
| DA Elongation | 128.50 | 127.50 | 113.00 | 124.00 | 121.50 | 121.00 | 108.50 |

EXAMPLES 31-48

These Examples examine the use of a specific halogenated phosphorus compound Fyrol EFF with a variety of different polyols and various water levels which change the foam density. The benefit of the invention appears to be most pronounced with Thanol SF-5507, but is present with Arcol ® 1345 and Arcol 1343 also. Again, the data presented represents the average of two runs of the same composition.

TABLE Va

Foams with Halogenated Phosphorus Compounds and Various Polyols

| ↓ Ingr./Ex.→ | 31 | 32 | 33 | 34 | 35 | 36 |
|---|---|---|---|---|---|---|
| Niax 34-28 | 50.00 | 50.00 | 50.00 | 50.00 | 50.00 | 50.00 |
| Water | 2.74 | 2.74 | 2.74 | 2.74 | 2.74 | 2.74 |
| 85/15: DEA in H2O | 1.76 | 1.76 | 1.76 | 1.76 | 1.76 | 1.76 |
| DC-5034 | 1.50 | 1.50 | 1.50 | 1.50 | 1.50 | 1.50 |
| BL-17 | 0.30 | 0.30 | 0.30 | 0.30 | 0.30 | 0.30 |
| Dabco ® 33LV | 0.55 | 0.55 | 0.55 | 0.55 | 0.55 | 0.55 |
| Fyrol EEF | 2.00 | — | 2.00 | — | 2.00 | — |
| Thanol SF-5507 | 50.00 | 50.00 | — | — | — | — |
| Arcol 1345 | — | — | 50.00 | 50.00 | — | — |
| Arcol 1343 | — | — | — | — | 50.00 | 50.00 |
| TOTAL: | 108.85 | 106.85 | 108.85 | 106.85 | 108.85 | 106.85 |
| Isocyanate Index | 100 | 100 | 100 | 100 | 100 | 100 |
| Isoc. Add., g | 38.24 | 38.24 | 38.24 | 38.24 | 38.24 | 38.24 |
| PROPERTIES |  |  |  |  |  |  |
| Density-Part Wt. | 604.95 | 598.65 | 596.50 | 580.85 | 596.10 | 604.30 |
| Density-Core Wt. | 2.40 | 2.32 | 2.28 | 2.26 | 2.33 | 2.32 |
| ILD |  |  |  |  |  |  |
| 25% | 28.65 | 29.15 | 25.40 | 27.00 | 25.80 | 27.05 |
| 65% | 82.00 | 82.40 | 74.50 | 75.65 | 72.05 | 75.25 |
| 25%R | 23.90 | 24.50 | 22.30 | 22.90 | 21.80 | 23.00 |
| 25% Core Wt. | 11.94 | 12.56 | 11.60 | 11.98 | 11.07 | 11.66 |
| 65% Core Wt. | 34.17 | 35.52 | 32.75 | 33.56 | 30.92 | 32.44 |
| 25% Part Wt. | 4.74 | 4.87 | 4.43 | 4.65 | 4.33 | 4.48 |
| 65% Part Wt. | 13.55 | 13.76 | 12.49 | 13.02 | 12.09 | 12.46 |
| Sag Factor | 2.86 | 2.83 | 2.82 | 2.80 | 2.79 | 2.78 |
| Comp. Set 50% | 9.46 | 11.18 | 10.21 | 10.94 | 10.90 | 10.06 |
| Comp. Set 75% | 9.48 | 11.48 | 9.79 | 11.33 | 9.67 | 10.09 |

TABLE Va-continued

Foams with Halogenated Phosphorus Compounds and Various Polyols

|  | 31 | 32 | 33 | 34 | 35 | 36 |
|---|---|---|---|---|---|---|
| C.S. 50% H.A. | 16.35 | 18.87 | 17.36 | 19.47 | 16.93 | 18.25 |
| Wt. St. 50% | 32.65 | 34.09 | 32.26 | 33.06 | 34.06 | 31.84 |
| Tear strength, psi | 1.40 | 1.50 | 1.55 | 1.40 | 1.65 | 1.35 |
| Tensile str., psi | 18.40 | 17.65 | 19.55 | 18.35 | 20.65 | 18.70 |
| Tensile DA | 20.05 | 20.05 | 21.25 | 22.35 | 21.00 | 21.60 |
| % Loss | −8.9 | −13.8 | −10.3 | −21.9 | −1.8 | −15.4 |
| Elongation, % | 116.00 | 113.00 | 119.50 | 115.00 | 123.50 | 114.50 |
| DA Elongation | 124.50 | 124.00 | 131.50 | 135.00 | 130.50 | 138.50 |

TABLE Vb

Foams with Halogenated Phosphorus Compounds and Various Polyols

| ↓ Ingr./Ex.→ | 37 | 38 | 39 | 40 | 41 | 42 |
|---|---|---|---|---|---|---|
| Niax 34-28 | 50.00 | 50.00 | 50.00 | 50.00 | 50.00 | 50.00 |
| Water | 3.24 | 3.24 | 3.24 | 3.24 | 3.24 | 3.24 |
| 85/15: DEA in H2O | 1.76 | 1.76 | 1.76 | 1.76 | 1.76 | 1.76 |
| DC-5034 | 1.50 | 1.50 | 1.50 | 1.50 | 1.50 | 1.50 |
| BL-17 | 0.30 | 0.30 | 0.30 | 0.30 | 0.30 | 0.30 |
| Dabco ® 33LV | 0.55 | 0.55 | 0.55 | 0.55 | 0.55 | 0.55 |
| Fyrol EEF | 2.00 | — | 2.00 | — | 2.00 | — |
| Thanol SF-5507 | 50.00 | 50.00 | — | — | — | — |
| Arcol 1345 | — | — | 50.00 | 50.00 | — | — |
| Arcol 1343 | — | — | — | — | 50.00 | 50.00 |
| Diethanol-amine | — | — | — | — | 0.50 | 0.50 |
| TOTAL: | 109.85 | 106.85 | 109.85 | 106.85 | 109.85 | 106.85 |
| Isocyanate Index | 100 | 100 | 100 | 100 | 100 | 100 |
| Isoc. Add., g | 43.07 | 43.07 | 43.07 | 43.07 | 44.32 | 44.32 |
| PROPERTIES |  |  |  |  |  |  |
| Density-Part Wt. | 535.80 | 523.75 | 535.25 | 525.65 | 538.85 | 533.05 |
| Density-Core Wt. | 2.18 | 2.09 | 2.11 | 2.07 | 2.11 | 2.10 |
| ILD |  |  |  |  |  |  |
| 25% | 27.15 | 28.80 | 26.30 | 26.30 | 23.65 | 25.15 |
| 65% | 79.25 | 82.75 | 75.15 | 74.50 | 68.50 | 72.75 |
| 25%R | 22.05 | 22.65 | 21.25 | 21.40 | 19.65 | 20.90 |
| 25% Core Wt. | 12.48 | 13.78 | 12.49 | 12.74 | 11.23 | 12.01 |

TABLE Vb-continued

Foams with Halogenated Phosphorus Compounds and Various Polyols

|  | 37 | 38 | 39 | 40 | 41 | 42 |
|---|---|---|---|---|---|---|
| 65% Core Wt. | 18.12 | 10.62 | 35.70 | 36.08 | 32.54 | 34.73 |
| 25% Part Wt. | 5.07 | 5.50 | 4.91 | 5.00 | 4.39 | 4.72 |
| 65% Part Wt. | 14.79 | 15.80 | 14.04 | 14.17 | 12.71 | 13.65 |
| Sag Factor | 2.92 | 2.87 | 2.86 | 2.83 | 2.90 | 2.89 |
| Comp. Set 50% | 14.47 | 15.08 | 13.67 | 15.86 | 12.18 | 13.66 |
| Comp. Set 75% | 14.34 | 31.60 | 12.52 | 22.76 | 10.21 | 14.79 |
| C.S. 50% H.A. | 21.15 | 24.75 | 20.99 | 25.83 | 16.73 | 23.88 |
| Wt. Set 50% | 32.82 | 32.73 | 34.88 | 34.71 | 28.17 | 30.74 |
| Tear strength, psi | 1.65 | 1.40 | 1.50 | 1.55 | 1.45 | 1.40 |
| Tensile str., psi | 22.30 | 21.20 | 23.00 | 21.95 | 16.10 | 20.20 |
| Tensile DA | 22.20 | 23.00 | 25.45 | 23.90 | 17.35 | 21.60 |
| % Loss | 0.4 | −8.6 | −10.7 | −9.0 | −7.9 | −6.9 |
| Elongation, % | 116.00 | 107.50 | 113.50 | 115.50 | 95.50 | 110.50 |
| DA Elongation | 123.00 | 129.50 | 133.50 | 136.00 | 106.00 | 127.00 |

TABLE Vc

Foams with Halogenated Phosphorus Compounds and Various Polyols

| ↓ Ingr./Ex.→ | 43 | 44 | 45 | 46 | 47 | 48 |
|---|---|---|---|---|---|---|
| Niax 34-28 | 50.00 | 50.00 | 50.00 | 50.00 | 50.00 | 50.00 |
| Water | 3.74 | 3.74 | 3.74 | 3.74 | 3.74 | 3.74 |
| 85/15: DEA in H$_2$O | 1.76 | 1.76 | 1.76 | 1.76 | 1.76 | 1.76 |
| DC-5034 | 1.50 | 1.50 | 1.50 | 1.50 | 1.50 | 1.50 |
| BL-17 | 0.30 | 0.30 | 0.30 | 0.30 | 0.30 | 0.30 |
| Dabco ® 33LV | 0.55 | 0.55 | 0.55 | 0.55 | 0.55 | 0.55 |
| Fyrol EEF | 2.00 | — | 2.00 | — | 2.00 | — |
| Thanol SF-5507 | 50.00 | 50.00 | — | — | — | — |
| Arcol 1345 | — | — | 50.00 | 50.00 | — | — |
| Arcol 1343 | — | — | — | — | 50.00 | 50.00 |
| Diethanolamine | — | — | — | — | 0.50 | 0.50 |
| TOTAL: | 109.85 | 107.85 | 109.85 | 107.35 | 109.85 | 107.85 |
| Isocyanate Index | 100 | 100 | 100 | 100 | 100 | 100 |
| Isoc. Add., g | 47.91 | 47.91 | 47.91 | 47.91 | 49.15 | 49.15 |
| PROPERTIES | | | | | | |
| Density-Part Wt. | 481.50 | 470.05 | 478.80 | 462.43 | Foam collapsed | Foam collapsed |
| Density-Core Wt. | 1.94 | 1.88 | 1.92 | 1.82 | | |
| ILD | | | | | | |
| 25% | 24.75 | 24.90 | 21.65 | 22.00 | | |
| 65% | 75.00 | 74.15 | 66.25 | 65.90 | | |
| 25%R | 19.55 | 19.65 | 17.40 | 17.65 | | |
| 25% Core Wt. | 12.79 | 13.28 | 11.30 | 12.10 | | |
| 65% Core Wt. | 19.13 | 19.97 | 34.59 | 36.22 | | |
| 25% Part Wt. | 5.14 | 5.30 | 4.52 | 4.76 | | |
| 65% Part Wt. | 15.58 | 15.78 | 13.83 | 14.25 | | |
| Sag Factor | 3.03 | 2.98 | 3.07 | 3.00 | | |
| Comp. Set 50% | 19.87 | 22.21 | 16.75 | 22.58 | | |
| Comp. Set 75% | 16.18 | 17.73 | 15.69 | 19.04 | | |
| C.S. 50% H.A. | 24.37 | 29.70 | 22.27 | 23.07 | | |
| Wt. Set 50% | 33.16 | 35.99 | 33.11 | 35.80 | | |
| Tear strength, psi | 1.60 | 1.35 | 1.50 | 1.55 | | |
| Tensile str., psi | 20.80 | 20.40 | 18.65 | 19.90 | | |
| Tensile DA | 22.35 | 21.90 | 21.10 | 21.55 | | |
| % Loss | −7.7 | −7.6 | −13.0 | −8.2 | | |
| Elongation, % | 111.50 | 102.00 | 103.50 | 107.00 | | |
| DA Elongation | 116.50 | 118.50 | 117.00 | 118.00 | | |

EXAMPLES 49–52

Examples 49–52 employ three different flame retardants, two containing halogen (Fyrol EFF and CEF) and one phosphate flame retardant additive which does not contain a halogen, dimethyl methylphosphonate (Fyrol DMMP). Again, the data presented represents the average of two runs of the same composition.

TABLE VI

Foams with Halogenated and Non-Halogenated Phosphorus Compounds

| ↓ Ingr./Ex.→ | 49 | 50 | 51 | 52 |
|---|---|---|---|---|
| Niax 34-28 | 50.00 | 50.00 | 50.00 | 50.00 |
| Water | 3.74 | 3.74 | 3.74 | 3.74 |
| 85/15: DEA in H$_2$O | 1.76 | 1.76 | 1.76 | 1.76 |
| DC-5034 | 1.50 | 1.50 | 1.50 | 1.50 |
| BL-17 | 0.30 | 0.30 | 0.30 | 0.30 |
| Dabco ® 33LV | 0.55 | 0.55 | 0.55 | 0.55 |
| Fyrol EEF | — | 2.00 | — | — |
| Fyrol CEF | — | — | 2.00 | — |
| Fyrol DMMP | — | — | — | 2.00 |
| Thanol SF-5507 | 50.00 | 50.00 | 50.00 | 50.00 |
| TOTAL: | 107.85 | 107.35 | 107.35 | 107.35 |
| Isocyanate Index | 100 | 100 | 100 | 100 |
| Isoc. Add., g | 47.91 | 47.91 | 47.91 | 47.91 |
| PROPERTIES | | | | |
| Density-Part Wt. | 466.95 | 477.00 | 474.30 | 469.30 |
| Density-Core Wt. | 1.86 | 1.91 | 1.91 | 1.90 |
| ILD | | | | |
| 25% | 23.55 | 22.25 | 21.65 | 21.40 |
| 65% | 68.40 | 66.05 | 64.80 | 64.75 |
| 25%R | 18.00 | 17.25 | 16.75 | 16.80 |
| 25% Core Wt. | 12.69 | 11.65 | 11.33 | 11.26 |
| 65% Core Wt. | 36.87 | 34.58 | 33.93 | 34.08 |
| 25% Part Wt. | 5.04 | 4.66 | 4.56 | 4.56 |
| 65% Part Wt. | 14.65 | 13.85 | 13.66 | 13.80 |
| Sag Factor | 2.91 | 2.97 | 2.99 | 3.03 |
| Comp. Set 50% | 22.08 | 16.89 | 18.67 | 15.15 |
| Comp. Set 75% | 22.06 | 15.38 | 21.45 | 16.40 |
| C.S. 50% H.A. | 28.67 | 21.63 | 24.31 | 26.44 |
| Wt. Set 50% | 38.66 | 36.11 | 36.06 | 31.42 |
| Tear strength, psi | 1.45 | 1.55 | 1.45 | 1.60 |
| Tensile str., psi | 19.60 | 18.35 | 19.90 | 19.80 |
| Tensile DA | 24.30 | 22.45 | 22.90 | 20.70 |
| % Loss | −24.3 | −23.5 | −15.1 | −4.5 |
| Elongation, % | 107.50 | 105.50 | 107.00 | 101.50 |
| DA Elongation | 136.00 | 122.00 | 129.50 | 127.00 |

EXAMPLES 53–59

These Examples compare Fyrol EFF with phosphoric acid to see if the acid number of the flame retardant is an important parameter in providing improved compression set values. However, the data tend to indicate that it is not important as Fyrol EFF is better than the acidified polyol. The data presented in Examples 53–55 represent the average of two runs of the same composition. Examples 56-59 are single runs. Polyol 745106E is Arcol® 1345 polyol acidified with 43% H₃PO₄ (4 drops per 3200 g) to a pH of 4.

TABLE VII

| | Foams with a Halogenated Phosphorus Compound and/or an Acidified Polyol | | | | | | |
|---|---|---|---|---|---|---|---|
| | 53 | 54 | 55 | 56 | 57 | 58 | 59 |
| Ingr./Ex.→ | | | | | | | |
| Niax 34-28 | 50.00 | 50.00 | 50.00 | 50.00 | 50.00 | 50.00 | 50.00 |
| Water | 3.74 | 3.74 | 3.74 | 3.74 | 3.74 | 3.74 | 3.74 |
| 85/15: DEA in H₂O | 1.76 | 1.76 | 1.76 | 1.76 | 1.76 | 1.76 | 1.76 |
| DC-5034 | 1.50 | 1.50 | 1.50 | 1.50 | 1.50 | 1.50 | 1.50 |
| BL-17 | 0.30 | 0.30 | 0.30 | 0.30 | 0.30 | 0.30 | 0.30 |
| Dabco® 33LV | 0.55 | 0.55 | 0.55 | 0.55 | 0.55 | 0.55 | 0.55 |
| Fyrol EEF | — | — | 2.00 | — | — | — | — |
| Arcol 1345 | 50.00 | — | 50.00 | 50.00 | — | 50.00 | — |
| 745106E | — | 50.00 | — | — | 50.00 | — | 50.00 |
| TOTAL: | 107.85 | 107.85 | 109.85 | 107.85 | 107.85 | 107.85 | 107.85 |
| Isocyanate Index | 100 | 100 | 100 | 100 | 100 | 100 | 100 |
| Isoc. Add., g | 47.91 | 47.91 | 47.91 | 47.91 | 47.91 | 47.91 | 47.91 |
| PROPERTIES | | | | | | | |
| Density-Part Wt. | 468.20 | 457.10 | 472.50 | 473.9 | 459.8 | 457.9 | 446.0 |
| Density-Core Wt. | 1.78 | 1.74 | 1.81 | — | — | — | — |
| ILD | | | | | | | |
| 25% | 22.70 | 22.00 | 22.25 | 24.10 | 23.50 | 21.50 | 22.80 |
| 50% | 43.45 | 41.90 | 43.05 | 46.20 | 45.20 | 42.20 | 44.30 |
| 65% | 68.85 | 66.75 | 64.75 | 73.20 | 72.70 | 68.00 | 73.00 |
| 25%R | 17.30 | 16.25 | 17.15 | 18.10 | 17.30 | 16.00 | 16.80 |
| 25% Core Wt. | 12.75 | 12.64 | 12.33 | — | — | — | — |
| 65% Core Wt. | 20.20 | 19.60 | 35.88 | — | — | — | — |
| 25% Part Wt. | 4.85 | 4.81 | 4.71 | 5.09 | 5.11 | 4.70 | 5.11 |
| 65% Part Wt. | 14.70 | 14.60 | 13.70 | 15.45 | 15.81 | 14.85 | 16.37 |
| Sag Factor | 3.03 | 3.03 | 2.91 | 3.04 | 3.09 | 3.16 | 3.20 |
| Comp. Set 50% | 19.38 | 19.67 | 16.34 | 14.74 | 15.26 | 14.97 | 18.52 |
| Comp. Set 75% | 18.88 | 25.08 | 14.03 | 15.99 | 19.04 | 21.56 | 40.07 |
| C.S. 50% H.A. | 38.73 | 41.46 | 26.13 | — | — | — | — |
| Wt. Set 50% | 37.60 | 38.03 | 35.22 | 39.50 | 39.62 | 39.83 | 40.89 |
| Tear strength, psi | 1.50 | 1.40 | 1.60 | 1.40 | 1.50 | 1.50 | 1.60 |
| Tensile str., psi | 18.65 | 19.65 | 18.05 | 19.70 | 19.70 | 18.80 | 18.90 |
| Tensile DA | 22.05 | 21.70 | 20.15 | 23.00 | 21.90 | 21.30 | 21.60 |
| % Loss | −18.8 | −10.4 | −11.6 | −16.8 | −11.2 | −13.3 | −14.3 |
| Elongation, % | 113.00 | 114.50 | 112.00 | 112.00 | 118.00 | 117.00 | 116.00 |
| DA Elongation | 135.50 | 144.00 | 125.00 | 135.00 | 145.00 | 141.00 | 139.00 |

The data demonstrate that the addition of non-halogenated and halogenated phosphates to HR foam formulations not only reduces the flammability of the foam, as shown by the MVSS-302 data, but also results in an unexpected and pronounced improvement in foam static fatigue properties as mentioned by compression set tests.

Many modifications may be made in the polyurethane foams of this invention and their method of production without departing from the spirit and scope of the invention, which is defined only in the appended claims. For example, one skilled in the art could adjust the temperature, pressure, reactants, proportions and modes of additions within the parameters set forth to provide polyurethane foams with particularly advantageous properties. Other phosphorus compounds besides those specifically set forth may also be used within the claimed spirit and scope of the invention. It will also be appreciated that although only one phosphorus compound is used at a time in each of the illustrative examples, that it is anticipated that more than one phosphorus compound may be employed simultaneously to advantage.

GLOSSARY

Arcol® 1343—A polyol for use in HR molded foams containing 16% ethylene oxide as a cap, made by Arco Chemical Company.

Arcol® 1345—A polyol for use in HR molded foams containing a 19% ethylene oxide addition as a cap, made by Arco Chemical Company.

BL-17—Bis-[N,N'-dimethylaminoethyl]ether; a solution of dipropylene glycol, formic acid and dimethylaminoethyl ether.

Dabco® 33LV—A product of Air Products and Chemicals Inc.; a solution of 33% triethylenediamine catalyst in dipropylene glycol.

DC-5043—A silicone surfactant for use in HR molded foams sold by Air Products and Chemicals, Inc.

Fyrol® CEF—Tri(β-chloroethyl)phosphate additive flame retardant containing chlorine and phosphorus made by Stauffer Chemical Company.

Fyrol® DMMP—Dimethyl methylphosphonate high phosphorus content flame retardant with high solvency made by Stauffer Chemical Company.

Fyrol® EEF—An oligomeric chloroalkyl phosphate flame retardant containing chlorine and phosphorus made by Stauffer Chemical Company.

% Loss—Calculated as follows:

$$\frac{CLD\ 50\% - CLD\ 50\%\ humid\ aging}{CLD\ 50\%}$$

MVSS-302—Abbreviation referring to Motor Vehicle Safety Standard 302; a standard automotive foam flammability test.

Niax® 34-28—A SAN-based polymer polyol made by Union Carbide Corp.

Pluracol®-973—P-973; SAN-based polymer polyol made by BASF.

Thanol® SF-5507 polyol—A glycerin initiated polyether of propylene oxide capped with about 16% ethylene oxide, with a hydroxyl number of 34 modified with the diglycidyl ether of Bisphenol A, made by Arco Chemical Company.

Thermolin® 101—Tetrakis(2-chloroethyl)ethylene diphosphate (halogenated phosphate) flame retardant made by BASF.

I claim:

1. A high resilience (HR) molded polyurethane foam composition having improved static fatigue properties comprising the reaction product of a polyol blend having at least two polyols where at least one polyol is a polymer polyol, with a polyisocyanate in the presence of a polyurethane catalyst, and further in the presence of a blowing agent comprising water in the additional presence of at least one phosphorus compound of a formula selected from the group consisting of:

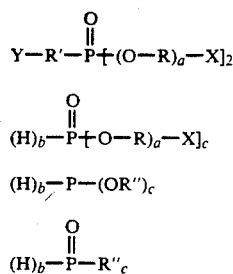

where
R is an alkylene group of 1 to 5 carbon atoms;
R′ is an alkylene group of 1 to 9 carbon atoms or an arylene group of 6 to 10 carbon atoms when Y is other than hydrogen and R′ is R″ when Y is hydrogen;
R″ is an alkyl group of 1 to 9 carbon atoms or an aryl group of 6 to 10 carbon atoms;
X is hydrogen or halogen;
Y is hydrogen or —P(=O)—[—(O—R)$_a$—X]$_2$;
a is from 1 to 4;
b is 0 when c is 3; and
b is 1 when c is 2;
where the phosphorous compound is present in an amount effective to improve static fatigue properties in the resultant HR molded polyurethane foam composition over a HR molded polyurethane foam composition without said effective amount of phosphorous compound and further where the resultant HR molded polyurethane foam composition with improved static fatigue properties has a sag factor of at least 2.79.

2. The HR molded polyurethane foam composition of claim 1 where the proportion of phosphorus compound based on the polyol is at least 0.5 parts per hundred parts of polyol.

3. The HR molded polyurethane foam composition of claim 1 where the proportion of phosphorus compound based on the polyol is at least 1.0 parts per hundred parts of polyol.

4. The HR molded polyurethane foam composition of claim 1 where the phosphorus compound is selected from the group consisting of tri(β-chloroethyl)phosphate; tri(β-chloropropyl)phosphate; dichloroethyl methylphosphate; tetrakis(2-chloroethyl)ethylene diphosphate; dimethyl methylphosphonate; diphenyl methylphosphate; triethylphosphate; tricrysylphosphate (TCP); triphenylphosphite; triethylphosphite; triethylphosphine oxide; triphenylphosphine oxide; and mixtures thereof.

5. The HR molded polyurethane foam composition of claim 1 where the phosphorus compound is added to the polyol prior to the mixing of the polyisocyanate therewith.

6. A high resilience (HR) molded polyurethane foam composition having improved static fatigue properties comprising the reaction product of a polyol blend having at least two polyols where at least one polyol is a polymer polyol, with a polyisocyanate in the presence of a polyurethane catalyst, and further in the presence of a blowing agent comprising water in the additional presence of at least one phosphorous compound of a formula selected from the group consisting of:

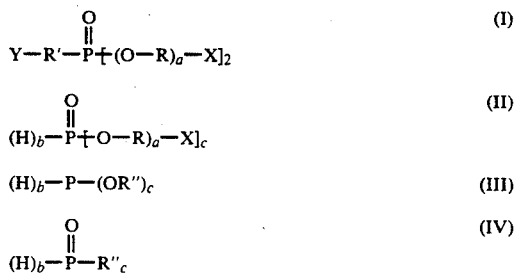

where
R is an alkylene group of 1 to 5 carbon atoms;
R′ is an alkylene group of 1 to 9 carbon atoms or an arylene group of 6 to 10 carbon atoms when Y is other than hydrogen and R′ is R″ when Y is hydrogen;
R″ is an alkyl group of 1 to 9 carbon atoms or an aryl group of 6 to 10 carbon atoms;
X is hydrogen or halogen;
Y is hydrogen or —P(=O)—[—(O—R)$_a$—X]$_2$;
a is from 1 to 4;
b is 0 when c is 3; and
b is 1 when c is 2;
where the proportion of phosphorus compound based on the polyol is at least 0.5 parts per hundred parts of polyol to improve the static fatigue properties of the resultant HR molded polyurethane foam composition over a HR molded polyurethane foam composition without said phosphorus compound, and where the phosphorus compound is added to the polyol prior to the mixing of the polyisocyanate therewith and further where the resultant HR molded polyurethane foam composition with improved static fatigue properties has a sag factor of at least 2.79.

7. The HR molded polyurethane foam composition of claim 6 where the phosphorus compound is selected from the group consisting of tri(β-chloroethyl)phosphate; tri(β-chloropropyl)phosphate; dichloroethyl methylphosphate; tetrakis(2-chloroethyl)ethylene disphosphate; dimethyl methylphosphonate; diphenyl methylphosphate; triethylphosphate; tricrysylphosphate (TCP); triphenylphosphite; triethylphosphite; triethylphospine oxide; triphenylphosphine oxide; and mixtures thereof.

8. A method for making a high resilience (HR) molded polyurethane foam composition having improved static fatigue properties comprising the steps of
adding a water blowing agent and a polyurethane catalyst to a polyol blend having at least two polyols where at least one polyol is a polymer polyol;

adding an effective amount of at least one phosphorous compound of a formula selected from the group consisting of:

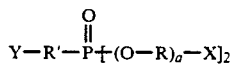 (I)

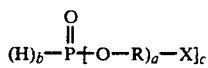 (II)

$(H)_b-P-(OR'')_c$ (III)

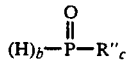 (IV)

where
R is an alkylene group of 1 to 5 carbon atoms;
R' is an alkylene group of 1 to 9 carbon atoms or an arylene group of 6 to 10 carbon atoms when Y is other than hydrogen and R' is R" when Y is hydrogen;
R" is an alkyl group of 1 to 9 carbon atoms or an aryl group of 6 to 10 carbon atoms;
X is hydrogen or halogen;
Y is hydrogen or $-P(=O)-[-(O-R)_a-X]_2$;
a is from 1 to 4;
b is 0 when c is 3; and
b is 1 when c is 2;
reacting the mixture of polyol, water, catalyst and halogenated phosphate with a polyisocyanate in a mold at an elevated temperature to form a HR molded polyurethane foam composition having improved static fatigue properties over a HR molded polyurethane foam composition without said phosphorus compound, where the HR molded polyurethane foam composition with improved static fatigue properties has a sag factor of at least 2.79.

9. The method of claim 8 where the proportion of phosphorus compound based on the polyol is at least 0.5 parts per hundred parts of polyol.

10. The method of claim 8 where the proportion of phosphorus compound based on the polyol is at least 1.0 parts per hundred parts of polyol.

11. The method of claim 8 where the phosphorus compound is selected from the group consisting of tri(β-chloroethyl)phosphate; tri(β-chloropropyl)phosphate; dichloroethyl methylphosphate; tetrakis(2-chloroethyl)ethylene diphosphate; dimethyl methylphosphonate; diphenyl methylphosphate; triethylphosphate; tricrysylphosphate (TCP); triphenylphosphite; triethylphosphite; triethylphosphine oxide; triphenylphosphine oxide; and mixtures thereof.

12. The method of claim 8 where the elevated temperature is within the range from about 70° F. to about 180° F.

13. A method for making a high resilience (HR) molded polyurethane foam composition having improved static fatigue properties comprising the steps of adding a water blowing agent and a polyurethane catalyst to a polyol blend having at least two polyols where at least one polyol is a polymer polyol; adding at least 0.5 parts per hundred parts of polyol of at least one phosphorous compound of a formula selected from the group consisting of:

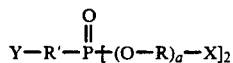 (I)

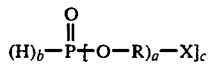 (II)

$(H)_b-P-(OR'')_c$ (III)

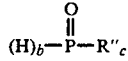 (IV)

where
R is an alkylene group of 1 to 5 carbon atoms;
R' is an alkylene group of 1 to 9 carbon atoms or an arylene group of 6 to 10 carbon atoms when Y is other than hydrogen and R' is R" when Y is hydrogen;
R" is an alkyl group of 1 to 9 carbon atoms or an aryl group of 6 to 10 carbon atoms;
X is hydrogen or halogen;
Y is hydrogen or $-P(=O)-[-(O-R)_a-X]_2$;
a is from 1 to 4;
b is 0 when c is 3; and
b is 1 when c is 2;
reacting the mixture of polyol, water, catalyst and halogenated phosphate with a polyisocyanate in a mold at a temperature within the range from about 70° F. to about 180° F. to form a HR molded polyurethane foam composition having improved static fatigue properties over a HR molded polyurethane foam composition without said phosphorus compound, where the HR molded polyurethane foam composition with improved static fatigue properties has a sag factor of at least 2.79.

14. The method of claim 13 where the proportion of phosphorus compound based on the polyol is at least 1.0 parts per hundred parts of polyol.

15. The method of claim 13 where the phosphorus compound is selected from the group consisting of tri(β-chloroethyl)phosphate; tri(β-chloropropyl)phosphate; dichloroethyl methylphosphate; tetrakis(2-chloroethyl)ethylene diphosphate; dimethyl methylphosphonate; diphenyl methylphosphate; triethylphosphate; tricrysylphosphate (TCP); triphenylphosphite; triethylphosphite; triethylphosphine oxide; triphenylphosphine oxide; and mixtures thereof.

* * * * *